United States Patent [19]
Anderson et al.

[11] Patent Number: 5,889,901
[45] Date of Patent: Mar. 30, 1999

[54] STRAIN MEASURING APPARATUS/METHOD HAVING A SENSOR AND A REFERENCE OPTICAL FIBER GRATING

[75] Inventors: Dana Zachary Anderson; Byeongha Lee, both of Boulder; William Charles Swann, Lafayette, all of Colo.

[73] Assignee: University Technology Corporation, Boulder, Colo.

[21] Appl. No.: 870,533

[22] Filed: Jun. 6, 1997

[51] Int. Cl.$^6$ ........................................... G02B 6/00
[52] U.S. Cl. .................... 385/12; 385/37; 385/27
[58] Field of Search .................... 385/12, 37, 1, 385/14, 27, 28, 13, 15

[56] References Cited

U.S. PATENT DOCUMENTS

| | | | |
|---|---|---|---|
| 4,915,468 | 4/1990 | Kim et al. ................................. | 385/12 |
| 5,208,877 | 5/1993 | Murphy et al. ........................... | 385/12 |

*Primary Examiner*—Phan T. H. Palmer
*Attorney, Agent, or Firm*—F. A. Sirr; E. C. Hancock; Holland & Hart llp

[57] ABSTRACT

A condition sensing apparatus/method includes a sensor-fiber-grating that is subjected to a physical condition or measurand (strain/temperature/pressure) that is to be sensed. A broad-band light beam is directed into the core of the sensor grating, and the constructive-interference light beam that is reflected from this sensor grating is directed into a reference-fiber-grating. The reference grating is subjected to a servo-controlled elongation force or strain, and in this manner the length of the reference grating is varied until the reference grating operates to reflect a maximum intensity of its received light beam, and to transmit a minimum intensity of its received light beam. This maximum/minimum condition of the reference grating is sensed by detecting the minimum intensity of a light beam that is transmitted through the reference grating. The physical strain of the reference grating at which this condition occurs is used as a measure of the measurand to which the sensor grating is subjected. Sensing the mechanical resonant frequency of the reference grating provides an output that indicates the magnitude of the measurand currently at the sensor grating.

45 Claims, 5 Drawing Sheets

LIGHT 11 INPUT SPECTRUM

Fig. 4

REFLECTION 18 BY SENSOR GRATING

Fig. 5

TRANSMISSION 25 BY REFERENCE GRATING

Fig. 6

OUTPUT LIGHT POWER $E_S = 0$, $E_R = 0$

BOTH GRATINGS UNSTRAINED $B_S \neq B_R$ : MINIMUM NOT DETECTED

Fig. 7A

SENSOR UNDER FULL COMPRESSIONAL STRAIN, E

REFERENCE UNDER SERVO STRAIN, $E_R = 0$

MINIMUM DETECTED

Fig. 7B

SENSOR UNDER ZERO STRAIN, $E_S = 0$

REFERENCE UNDER TENSIL STRAIN, $E_R = +E_{SC}$

MINIMUM DETECTED

Fig. 7C

SENSOR UNDER FULL TENSION STRAIN, $+E_{SC}$

REFERENCE UNDER TENSION STRAIN $E_R = +Z E_{SC}$

MINIMUM DETECTED

Fig. 7D

STRAIN MEASURING APPARATUS/ METHOD HAVING A SENSOR AND A REFERENCE OPTICAL FIBER GRATING

BACKGROUND OF THE INVENTION

1. Field of the Invention:

This invention relates to the use of an optical fiber, such as a fiber Bragg grating, to sense a physical condition such as strain, temperature gradient, or pressure (sometimes called a measurand) to which the optical fiber is subjected.

Figure 1:
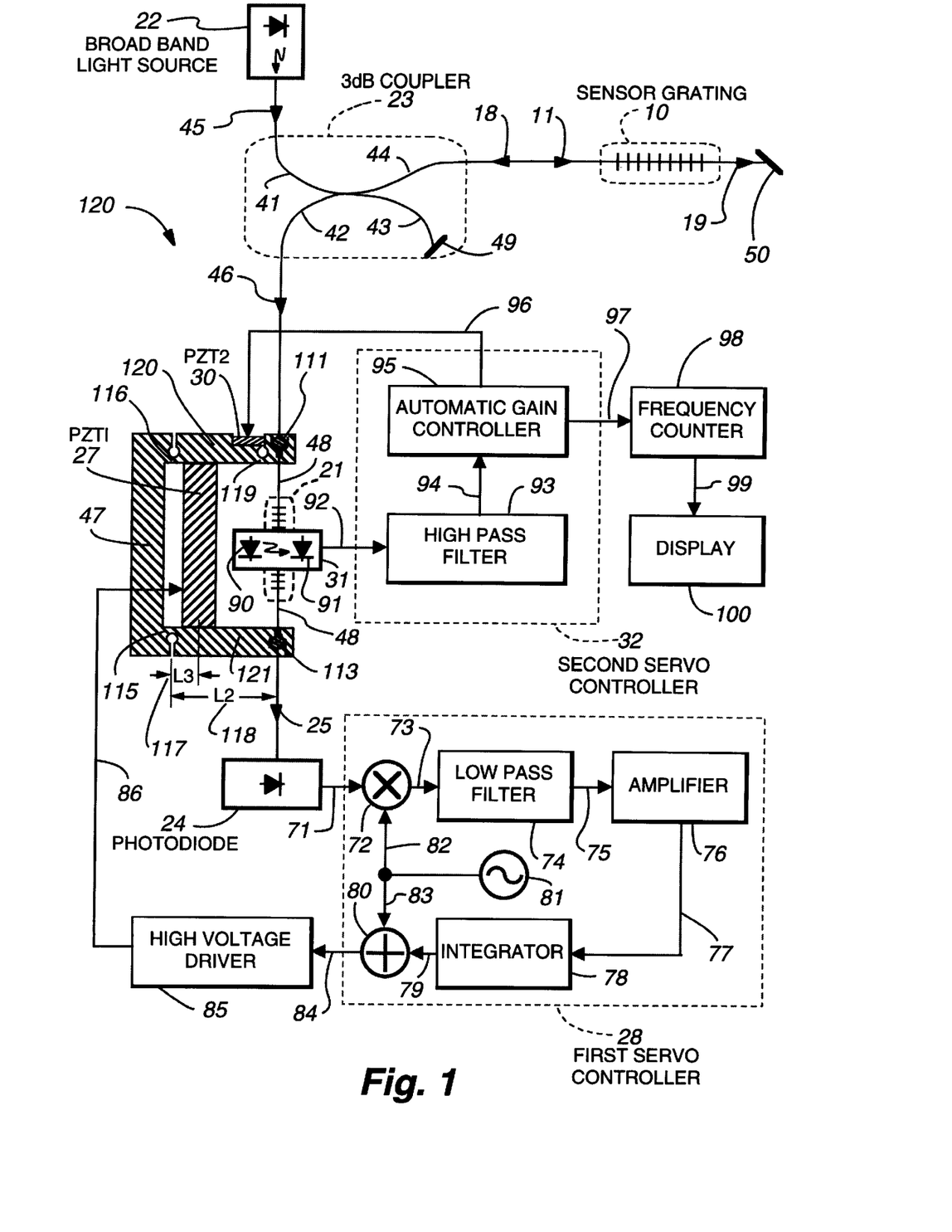
FIG. 1 is an embodiment of a measurand sensing system/apparatus/method in accordance with the present invention, a first embodiment of a flexure supports the reference grating being shown in FIG. 1.

2. Description of the Related Art:

This invention uses two well-known fiber gratings, one of which is called a sensor fiber grating herein, and the other of which is called a reference fiber grating herein, see fiber gratings 10 and 21 of FIG. 1.

A fiber grating of this type comprises a generally mid portion of an optical fiber that has a center and concentrically disposed light transmitting core, an intermediate cladding layer, and an outer buffer/jacket layer that operates to protect the optical fiber from physical damage. The fiber grating's core includes refractive index variations that are distributed along its length. These index changes, or variations, cause a portion of an input light beam to be reflected back out of the light entry end of the fiber grating's core. As is well known, at a critical wavelength, or frequency of the input light beam, all of the components of the reflected light, one component for each index change, interfere in a constructive manner, and a strong or high intensity reflected light beam is provided at this critical wavelength. This critical wavelength is called the Bragg wavelength.

As is known, this periodic index variation can be produced along the core of a single-mode optical fiber by illuminating the core with a periodically patterned Ultra Violet (UV) laser beam. Such an optical fiber, having periodic index variations along the length of its core, is known as an optical-fiber-grating, a fiber Bragg grating, or more simply a fiber-grating. Hereinafter, such an optical fiber will be called a fiber grating, or an optical fiber grating.

If one were to plot the amplitude of the refractive index within the fiber grating's core as a function of a distance that is measured along the core's length, the resultant curve would have a periodic variation, the core would have a nominal or average index of refraction, and the core's index of refraction would vary from this average value in a generally sinusoidal manner.

Mathematically, the Bragg wavelength "B" of a fiber grating is described as, $B=2Pn_o$ where P is the grating period P, and $n_o$ is the nominal or average refractive index of the core.

As shown by the above equation, the Bragg wavelength B of a fiber grating is shifted by a change in the grating period P, and/or by a change in the average refractive index no of the core. In general, the grating period and the average index of refraction change when the fiber grating is subjected to a change in strain (i.e., the fiber grating is stretched lengthwise), a change in length that is caused by a temperature change, or a change in length that is caused by pressure, all of which can be collectively defined as photoelastic and thermo-optic effects.

Both the peak reflectivity and the spectral bandwidth of a Bragg wavelength reflected light beam are functions of the fiber grating's length and the amount of refractive index variation that is present at each periodic index variation that exists along the fiber grating's core. While the two characteristics peak reflectivity and spectral bandwidth are related to the sensitivity of the construction and arrangement of the present invention, they have no effect on the basic function of the present invention.

As a result of the above properties of a well-known fiber grating, a fiber grating can be used as a strain sensor, and/or a temperature sensor, and/or a pressure sensor. In each case, the measurand strain/temperature/pressure is measured by measuring, or determining a shift in the fiber grating's Bragg wavelength from a calibration point, or by measuring the absolute value of the Bragg wavelength. In either event, knowledge of Bragg wavelength enables measurement of the measurand strain/temperature/pressure.

One known way to measure the Bragg wavelength of a fiber-grating is to use an optical spectrum analyzer that draws the wavelength spectrum of the fiber grating's reflected light beam or transmitted light beam. Using this instrument, the fiber grating's Bragg wavelength can be directly read as the center wavelength of the drawn wavelength spectrum. However, this use of an optical spectrum analyzer is expensive, slow, and requires the use of bulky equipment.

An interferometer, such as a fiber Fabry-Perot or a fiber Mach-Zehnder, can also be used to measure the shift of the fiber grating's Bragg wavelength, but this device is also expensive, and it is difficult to calibrate.

Conventionally, strain is also measured by means of an electrical resistance change, or perhaps by measuring an electrical capacitance change, of a device that is generally printed on a thin resin film. Generally, these sensors are designed for surface mounting only, and these sensors have a poor dynamic range due to the nonelastic nature of the films.

U.S. Pat. Nos. 4,915,468 and 5,208,877 are of general interest. Patent '468 describes photo induced reflective changes that are produced in a two-mode, elliptical-core, vibration-modal optical fiber strain sensor. Patent -877 describes a two-mode optical waveguide having a non-circular core, one embodiment of which is a strain gauge.

While the above-described apparatus/methods have been generally useful for their limited intended purposes, the need remains in the art of a strain sensing apparatus/method in which the magnitude of a strain-causing physical condition at the location of a sensor grating is detected by processing a beam output of the sensor grating by the use of a reference grating whose Bragg wavelength is controlled so as to be matched to the Bragg wavelength of the sensor grating.

SUMMARY OF THE INVENTION

While the sensing apparatus/method of this invention has general utility in the sensing of strain, temperature and/or pressure, a preferred embodiment to be describe relates to the measurement of a longitudinal strain that is applied to sensor fiber grating or fiber Bragg grating 10 of FIG. 1.

The sensing apparatus/method of the present application uses two fiber Bragg gratings 10,21. The first fiber Bragg grating 10 comprises a sensing element, sensor grating, sensor fiber grating, or sensor Bragg grating, hereinafter collectively called a sensor grating. The second fiber Bragg grating 21 comprises a reference element, reference grating, reference fiber grating, reference Bragg grating, or tunable filter element, hereinafter collectively called a reference grating.

Because such a sensor grating 10 is quite thin, and has no bulky parts, it can be installed on the surface of, or within, a composite material, such as concrete, without disturbing the structural/ornamental properties of the composite material. Because such a sensor/reference grating 10 is made of mainly of fused silica, it can withstand up to 1% in elongation strain without an appreciable grating property change occurring.

Figure 3:
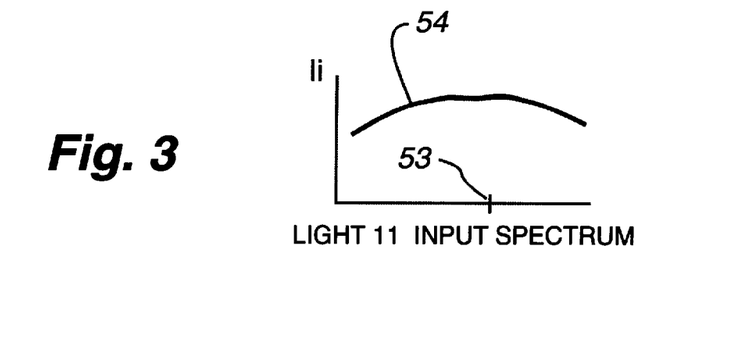
FIG. 3 is a simplified showing of the amplitude-versus-frequency spectrum of an broad bandwidth first input light beam Ii that is injected into a port of the light coupler shown in FIG. 1, wherein the light coupler, in turn, provides a second input light beam to the left-hand end of the sensor grating, this second input light beam having one-half the intensity of the first input light beam.

The sensing apparatus/method of this invention provides a sensor grating 10 whose light-entry-end receives a relatively broad wavelength band input light beam 11 that contains the Bragg wavelength Bs of sensor grating 10. FIG. 3 plots this input light beam, with light intensity on the vertical axis, with wavelength on the horizontal axis, with the broad spectrum or wavelength bandwidth of the input light beam plotted as curve 54, and with the Bragg wavelength Bs of sensor grating 10 shown at 53.

Some amount, intensity or quantity of this FIG. 3 input light beam, containing wavelengths on both sides of Bragg wavelength Bs or 53, is reflected back out of the input-light-entry end of sensor grating 10. The spectrum of the reflected light beam is determined by multiplying the input light spectrum with the reflectivity of sensor grating 10.

The sensor grating's reflected light (as well as the remaining light quantity that is transmitted through the sensor grating) contains wavelength information that relates to, and is indicative of, the magnitude of the measurand currently at sensor grating 10. This wavelength information is contained in terms of the Bragg wavelength Bs that is within the reflected light beam. While the sensor grating's transmitted light beam also contains the Bragg wavelength information Bs, in a preferred embodiment of this invention, the reflected light beam is used to detect the measurand's magnitude information.

The reflected light that is produced by sensor grating 10 is now directed to the light-input-end of reference grating 21. In a preferred embodiment of the invention, a light coupler 23, or 3 dB coupler, is used to direct and split both the input light beam and the reflected light beam.

Reference grating 21 is also a fiber grating whose spectral characteristic contains a peak reflectivity at a certain light wavelength that is called the Bragg wavelength Br of reference grating 21.

Figure 6:
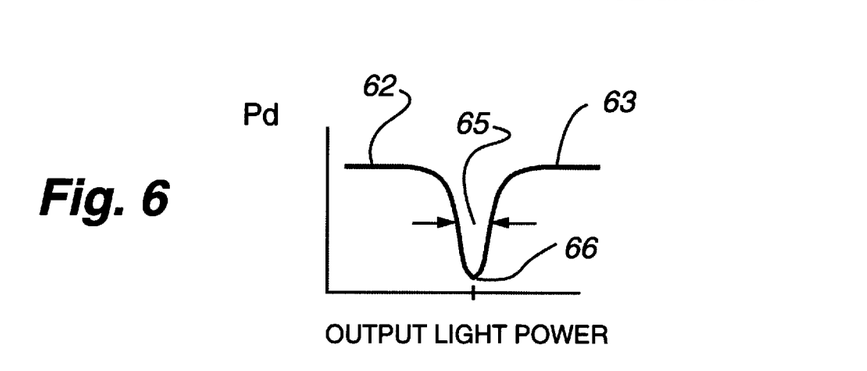
FIG. 6 is a simplified showing of the total intensity Pd of the light beam that is transmitted by the reference grating plotted as a function of the Bragg wavelength mismatch between the two fiber gratings, wherein this light beam intensity Pd has a minimum value when the two Bragg wavelengths are matched, and wherein the strain on the reference grating is servo-locked to this matched condition.
Figure 7A:
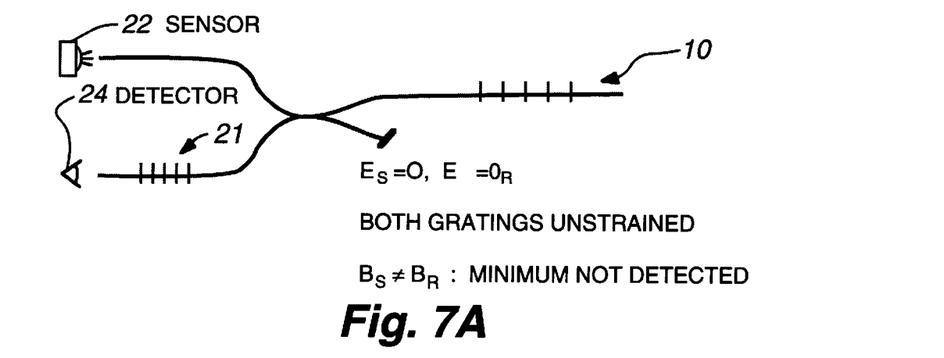
FIGS. 7A–7D show the Bragg grating and strain mismatch used to measure compressional strain.
Figure 7B:
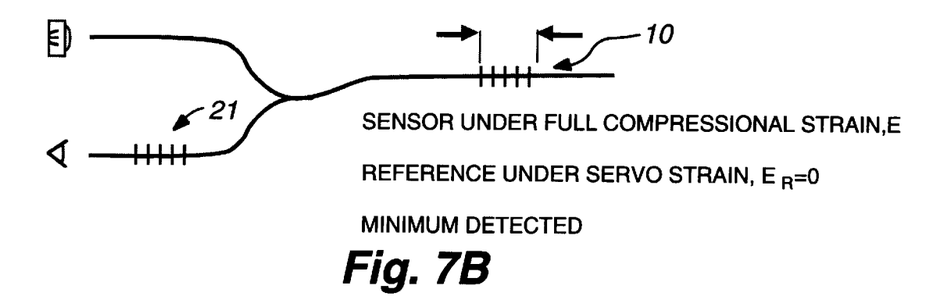
Figure 7C:
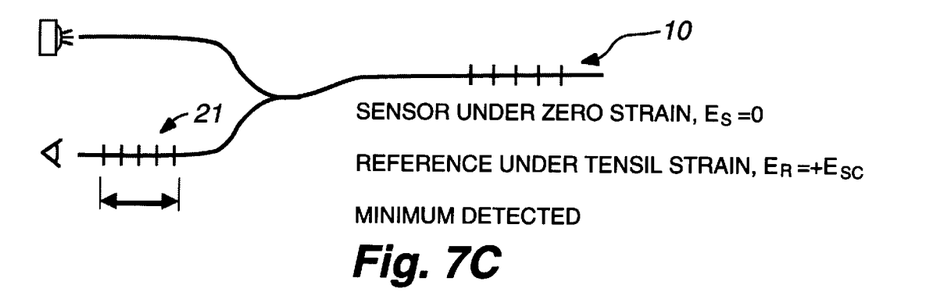
Figure 7D:
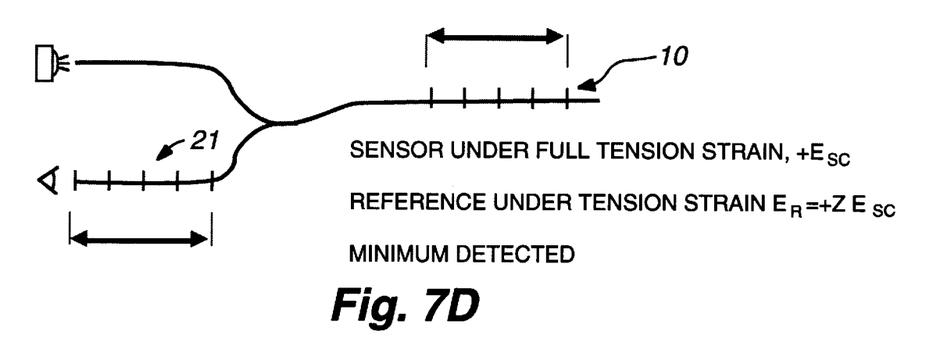

A first closed loop servo system 28, and its output longitudinal strain actuator 27, serve to produce a minimum intensity of a light beam that is transmitted out of the light-exit-end of reference grating 21, as is shown at 66 of FIG. 6.

The output of first servo system 28 applies a lengthwise strain to reference grating 21, and an input of first servo system 28 comprises the sensing of a minimum intensity light beam transmitted by reference grating 21. In this way, the reference fiber grating's lengthwise strain is increased/decreased until a minimum intensity transmitted light condition is found by servo system 28. In this condition of reference grating 21, its Bragg wavelength Br is reasonably matched to the Bragg wavelength Bs of sensor grating 10. Stated in another way, and with reference to FIG. 6, when these two Bragg wavelengths are matched, the total light intensity curve 62,66,63 is at the minimum intensity point 66 of the curve.

By monitoring the magnitude of the strain that is applied to reference grating 21 for this condition, one can detect the magnitude of the measurand currently at sensor grating 10. While this strain condition produces both a maximum intensity reflected light beam from reference grating 21, and a minimum intensity transmitted light beam from reference grating 21, in a preferred embodiment of the invention, the minimum transmitted light intensity is sensed, and the longitudinal strain then applied to reference grating 21 provides an output that is indicative of the measurand currently at sensor grating 10.

Stated in another way, in accordance with this invention, the Bragg wavelength Br of reference grating 21 is automatically adjusted to follow the sensor grating's Bragg wavelength Bs, as Bs changes due to measurand changes. A first servo controller 28 automatically adjusts the Bragg wavelength Br of reference grating 21 to produce a minimum transmitted light beam from reference grating 21.

The aforementioned strains are not necessarily the same. If the sensor grating is firmly embedded in a medium, it can respond to a compression strain. The reference grating, however, is not embedded and therefore can respond only to a tensional strain. Accordingly, in order to detect compression strain at the sensor, both the initial (unstrained) Bragg wavelengths of the two gratings and the strains on these gratings when the Bragg wavelengths are matched, are made to be different.

The extreme limit of this condition is, when the sensor grating is at its compression strain limit ($-E_{sc}$), its Bragg wavelength will be matched to a reference grating that is at nearly zero strain ($E_R=0$). Thus, throughout the measurement range of the sensor, the strain on the reference $E_R$ is greater than the strain on the sensor $E_S$ by the amount $+E_{SC}$ when the Bragg wavelengths are matched. It is possible to calibrate this strain offset into the readout device.

As a feature of the invention, servo-control of the reference grating's Bragg wavelength Br is dithered in order to determine whether to increase or to decrease the strain on reference grating 21 in order to produce the FIG. 6 minimum intensity point 66 where the two gratings 10,21 are Bragg matched to each other.

As a feature of this invention, and in order to measure the strain that is applied to reference grating 21 when a minimum magnitude transmitted light is passed by reference grating 21, the vibrational resonant frequency of the optical fiber that contains reference grating 21 is determined. That is, while the servo-controlled strain that is applied to reference grating 21 is of itself a direct measurement of the measurand to which sensor grating 10 is subjected, in a preferred embodiment of the present invention, this reference grating strain, and thereby the magnitude of the measurand, is measured by determining the vibrational resonant frequency of the fiber string that contains reference grating 21.

The vibrational resonant frequency of an elongated member, or string, whose opposite ends are clamped such that the string can be strained, such as the optical fiber string 48,21,48 that contains reference grating 21, is a basic property of the string, and this property is a function of lengthwise strain that is applied to the string. This resonant frequency does not vary as a function of the means by which the resonant frequency is measured. That is, for a given lengthwise strain that is applied to string 48,21,48, the string's resonant frequency depends only upon the given strain that is applied thereto.

In order to detect or sense the vibrational resonant frequency of the optical fiber string that contains reference grating 21, after the reference grating's Bragg wavelength Br has been matched to the sensor grating's Bragg wavelength Bs by operation of first closed loop servo 28, a self-sustaining oscillator, in the form of a second closed loop servo 32, is provided. An output actuator 30 of second closed loop servo 32 operates to transversely vibrate the reference grating string. An input of second closed loop servo 32 comprises detection of the vibration of the center part of the fiber string that contains reference grating 21.

This input to second closed loop servo 32 comprises a fiber displacement sensor 31, and more specifically, a displacement sensor 31 having an LED light emitter 90 and a photodetector 91 that are spaced apart. Reference grating 21 is positioned generally between LED light emitter 90 and photodetector 91. This self-sustaining oscillator operates to servo-lock onto the resonant frequency state of reference grating 21.

More specifically, at the resonant frequency point of reference grating 21, the center part of string 48,21,48 that contains reference grating 21 vibrates in-phase with the vibratory motion of output actuator PZT 2,30 of second closed loop servo 32. This produces an in-phase input signal 92 that results in self-sustaining vibration or oscillation of reference grating 21 at its resonant frequency; i.e., second closed loop servo 32 is locked onto the resonant frequency state of reference grating 21.

This locked-in state of second closed loop servo 32 is then read by a means, such as frequency counter 98, and frequency counter 98 then provides an output 99,100 that is indicative of the measurand magnitude currently at sensor grating 10.

Assuming a relatively constant temperature and pressure at the location of reference grating 21, the resonant frequency of reference grating 21 and the Bragg wavelength Bs of sensor grating 10 depend only upon the servo-controlled strain that is applied to reference grating 21, and the measurand-induced strain that is applied to sensor grating 10. The Bragg wavelength Br of reference grating 21 can be easily calibrated with the resonant frequency of the above-described self-sustaining oscillator that makes reference grating 21 oscillate at its own resonant frequency with the help of second servo loop 32.

Such an optical fiber comprises mainly silica, grating 10,21, and has negligible hysteresis characteristics up to about 1% strain, wherein strain is defined as the ratio between (1) the strain-induced length change of the grating, and (2) the original non-strain length of the grating.

The resolution of a measurand sensor in accordance with this invention is limited only by the length of the two gratings, the input light intensity, and whatever noise levels are associated with the two closed loop servos.

These and other objects, features and advantages of the present invention will be apparent to those of skill in the art upon reference to the following detailed description, which description makes reference to the drawing.

BRIEF DESCRIPTION OF THE DRAWING

FIG. 2A is a generalized configuration of a system in accordance with the present invention, while

DETAILED DESCRIPTION OF THE INVENTION

FIG. 1 shows the use of a fiber grating as the sensor grating 10 of a multi-component measurand-sensing apparatus/method 120 in accordance with the present invention.

Figure 4:
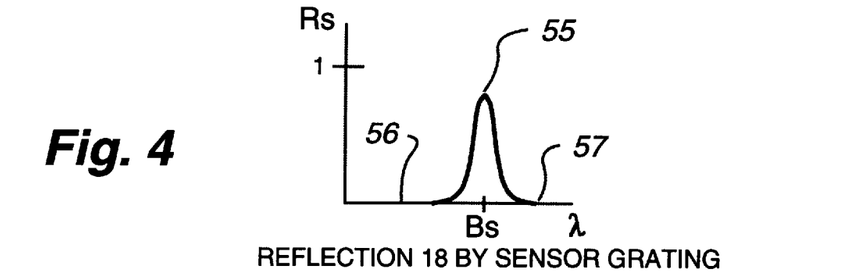
FIG. 4 is a simplified showing of the amplitude-versus-frequency spectrum of a first output light beam Rs that is reflected out of the left-hand entry end of the sensor grating and then injected into the light coupler, and wherein the light coupler, in turn, provides a second output light beam to the input-end of the reference grating, this second output light beam having one-half the intensity of the first output light beam.

The basic structural/functional elements of apparatus/method 120 are;

(1) a sensor grating 10 that is subjected to a measurand, such as the physical conditions strain/temperature/pressure whose magnitude is to be measured/sensed/detected by virtue of the sensor grating's Bragg wavelength being shifted as a function of the magnitude of the measurand, (2) a reference grating 21 that is subjected to a variable and servo-controlled vertical longitudinal strain in order to essentially match, or duplicate, the Bragg wavelength of sensor grating 10, thus enabling the measurement/detection/sensing of the magnitude of the measurand that is present at sensor grating 10, (3) a broad bandwidth light source 22 (LED) having an output light beam 45 that is transmitted into port 41 of a 3 dB coupler 23, and whose frequency spectrum is generally as shown in FIG. 3, this broad bandwidth being much broader than the bandwidth of the FIG. 4 reflectivity of sensor grating 10, (4) a 3 dB light coupler 23 operating to (a) split light beam 45 into two equal-intensity light beams, transmit one beam into port 43, and transmit the other beam into port 44, and (b) split reflected beam 18 received from sensor grating 10 into two equal-intensity beams, transmit one beam into port 41 and transmit the other beam into port 42, it being noted that there is no direct beam-coupling between coupler ports 41 and 42, (5) a light sensor, power meter, or photodiode 24 that receives and detects the intensity of a light beam 25 that is transmitted out of the exit end (i.e., the lower end in FIG. 1) of reference grating 21, (6) a support fixture or flexure 47 (or 150 of FIG. 2) that mechanically supports and applies a longitudinal strain or force to a fiber string 48,21,48 that includes reference grating 21 by the use of a first or longitudinal piezoelectric actuator 27 (PZT 1), (7) a second or transverse piezoelectric actuator 30 (PZT 2) that operates to vibrate reference grating string 48,21,48 in a transverse direction for the purpose of detecting the mechanical resonant frequency of the string when the longitudinal strain applied thereto causes the Bragg wavelength of reference grating 21 to be matched to the Bragg wavelength of sensor grating 10, (8) wherein PZT 1,27 operates under the control of a first closed loop servo system 28 to increase/decrease the lengthwise or longitudinal strain that is applied to the reference grating string, (9) wherein PZT 2,30 operates under the control of a second closed loop servo 32 to increase/decrease a transverse or vibratory force that is applied to the reference grating string, and (10) a displacement sensor 31 that operates to detect transverse vibratory motion of the reference grating string, wherein the amplitude and phase of this transverse motion are fed back to PZT 2,30 through second servo controller 32.

In operation, input light source 22 transmits input light beam 45 into port 41 of coupler 23. A first half of beam 45 (i.e., a beam having the same frequency spectrum as input beam 45, but only one-half the intensity of input beam 45) is guided to port 43, where it is eliminated by terminator 49. The second half of beam 45 is guided to port 44, where it exits coupler 23 as light beam 11 and then enters sensor grating 10 as an input light beam 11.

Sensor grating 10 now operates to reflect a portion of input beam 11 as reflected beam 18. The wavelength of reflected beam 18 is a function of the current Bragg condition of sensor grating 10. Since the current Bragg condition of sensor grating 10 is changed by the measurand (strain/temperature/pressure) to which sensor grating 10 is currently subjected, reflected beam 18 contains wavelength information that is related to the magnitude of this current measurand.

The portion 19 of input beam 11 that is transmitted (i.e., not reflected) by sensor grating 10 is preferably eliminated by terminator 50.

Reflected beam 18 now enters port 44 of coupler 23, where it is split into two preferably equal intensity beams, each of these two beams having one-half the intensity of reflected beam 18. These two halves of reflected beam 18 have the same frequency spectrum as reflected beam 18.

The first half of reflected beam 18 is guided to coupler port 41. While not critical to this invention, this first half of reflected beam 18 may interfere with beam 45, and this interference may result in a non-stable beam intensity in beam 45. In order to prevent or minimize this non-stable condition, it may be desirable to provide an isolator (not shown) at or near port 41, or it may be desirable to increase the physical length of the optical fiber that connects light source 22 to port 41 of coupler 23.

The second half of reflected beam 18 is guided to coupler port 42, where it exits coupler 23 as beam 46. Beam 46 now enters the input or upper end of reference grating 21.

Beam 46 is now reflected and transmitted by reference grating 21 in accordance with the magnitude of the longitudinal strain that is currently being applied to reference grating 21 by first servo mechanism 28 and its output actuator PZT 1; i.e., in accordance with the current Bragg wavelength of reference grating 21. The spectral shape of the beam (not shown) that is reflected by reference grating 21 is similar to FIG. 4 in that it has a single reflection peak at a wavelength that is determined by the strain that is currently applied to reference grating 21.

Beam 25 that is transmitted by reference grating 21 can be called a filtered beam 25 in that the frequency spectrum of beam 25 is determined by the longitudinal force or strain that is then being applied to reference grating 21. The total intensity of transmitted beam 25 is now detected by photodiode 24.

Output 71 from photodiode 24 depends very little on the wavelength spectrum of beam 25. Rather, photodiode 24 operates to provide an output 71 that is proportional to an integration of the intensity or power of all wavelength components that are within transmitted beam 25.

In summary, reflected beam 18 has a frequency/wavelength spectrum (FIG. 4) that varies as a function of (1) the frequency/wavelength spectrum of light source 22 (FIG. 3), and (2) the magnitude of the measurand to which sensor grating 10 is currently subjected. Mathematically, the frequency/wavelength spectrum of reflected beam 18 is given by the product of the spectrum of incident beam 11 and the reflection spectrum of sensor grating 10. When the spectral bandwidth of incident beam 11 (FIG. 3) is much broader than the bandwidth of reflected beam 18 (FIG. 4), and when the Bragg wavelength Bs or 55 of sensor grating 10 is within the bandwidth of incident beam 11, then reflected beam 18 has almost the same spectral shape as FIG. 4, with only a different peak intensity 55.

Figure 5:
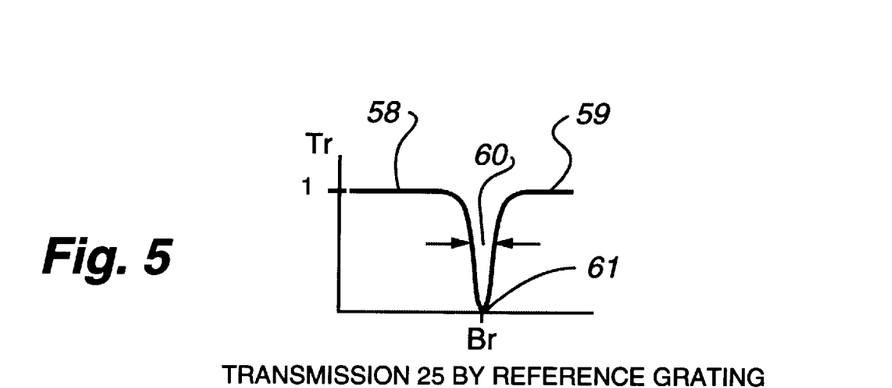
FIG. 5 is a simplified showing of the amplitude-versus-frequency spectrum of a light beam Tr that is transmitted out of the lower or exit end of the reference grating.

As can be seen from FIG. 5, reference grating 21 provides generally the same spectral shape as sensor grating 10, and the spectral shape of reference grating 21 has a single transmission minimum 61. This minimum 61 represents the filtering of input beam 46 by reference grating 21. FIG. 5 is the transmission spectrum of reference grating 21, and is generally equal to 1 minus the reflection spectrum of reference grating 21 (not shown). Mathematically, the frequency/wavelength spectrum of transmitted beam 25 is given by the product of the reflection spectrum of sensor grating 10, and the transmission spectrum of reference grating 21.

When the Bragg wavelength Br or 61 of reference grating 21 (see FIG. 5) is far from the Bragg wavelength Bs or 55 of sensor grating 10 (see FIG. 4), then most of incident beam 46 is transmitted through reference grating 21 within beam 25. That is, very little reflection of incident beam 46 occurs, and most of beam 46 exits reference sensor 21 as a transmitted beam 25. Stated in another way, for this Bragg mismatch condition, the transmission of reference grating 21 is unity for most of beam 46, as is shown by conditions 58 and 59 of FIG. 5. As a result, the output 71 of photodiode 24 is at a maximum.

However, when the respective Bragg wavelengths Bs and Br of sensor grating 10 and reference grating 21 are generally similar (compare FIG. 4 to FIG. 5), or when they are exactly matched, then most of beam 46 that is incident on reference grating 21 is reflected by reference grating 21, and a minimum output 71 from photodiode 24 results, as is shown at 66 in FIG. 6.

FIG. 6 is a plot of the total power (vertical axis) that is within transmission beam 25, as a function of the Bragg wavelength (horizontal axis) of reference grating 21. When the Bragg wavelength Br or 61 of reference grating 21 is the same as the Bragg wavelength Bs or 55 of sensor grating 10, then the output intensity of transmitted beam 25 is at the minimum 66 of FIG. 6. Between the two extremes of (1) exactly matched at 66 and (2) far-mismatched at 62 and 63, the total light intensity of transmitted beam 25 will depend upon the amount of Bragg wavelength mismatch that exists between sensor grating 10 and reference grating 21. The range of a transition zone 65 is given as a function of the bandwidths of both sensor grating 10 and reference grating 21.

It is important to remember that at any given time, (1) the Bragg wavelength 55 or Bs of reflected beam 18 is a direct function of the measurand to which sensor grating 10 is then subjected, and (2) the Bragg wavelength 61 or Br of reference grating 21 is a direct function of the servo-controlled strain to which reference grating 21 is then subjected. Therefore, when the Bragg wavelength Br of reference grating 21 is servo-controlled to match the Bragg wavelength Bs of sensor grating 10, the measurand then present at sensor grating 10 can be determined by measuring the strain that is applied to reference grating 21.

First servo controller 28 operates to apply a variable longitudinal, lengthwise, or vertical strain or force to reference grating 21 in order to produce a minimum power condition in transmitted light beam 25 when Br is matched to or equals Bs, as is shown at 66 of FIG. 6. The output actuator of first servo controller 28 comprises PZT 1 or 27 of FIG. 1. PZT 1 is driven by high voltage driver 85, so as to expand/contract, or spread-apart/bring-together, in a vertical direction, the two physically spaced, generally parallel, and horizontally extending ends or legs 120,121 of U-shaped metal flexure 47. As shown, the fiber optic string 48,21,48 that includes reference grating 21 is supported in a vertical position by the use of two end-disposed optical fiber pieces 48 that are attached to arms 120,121 by way of two beads 111,113 that are glued to the two fiber pieces 48.

Input voltage 84 to driver 85 is provided by a summing junction 80 that receives a first input 83 from the output of a dithering signal generator 81, and a second input 79 from the output of an integrator 78. In effect, the output of integrator 78 is modulated by the known frequency, small amplitude, dither signal 83. In a well known manner, a dither signal 82 from signal generator 81 is also used to demodulate output 71 that is received from photodiode 24 by way of the operation of multiplier 72. Output signal 73 from multiplier 72 is then filtered by low-pass filter 74. Output 75 provides an indication of the direction of control relative to the desired Bragg wavelength of reference grating 21.

That is, the magnitude of output 75 from low-pass filter 74 is proportional to the slope of the FIG. 6 curve 62,66,63. When the reference grating 21 Bragg wavelength Br (61 of FIG. 5) is the same as the sensor grating 10 Bragg wavelength Bs (55 of FIG. 4), then output 75 from low-pass filter 74 is zero. When the Bragg wavelength Br of reference grating 21 is shorter/longer than the Bragg wavelength of sensor grating 10, then output 75 is of a negative/positive polarity, respectively.

This output signal 75 from low-pass filter 75 (zero, negative-polarity, or positive-polarity) is now amplified by an amplifier 76, whose output 77 is provided as an input to integrator 78. So long as output 75 is not zero, output 79 from integrator 78, in combination with dither signal 83, operates to control driver 85 and PZT 1 in a manner to strain reference grating 21 in a direction so as to cause output 75 to thereafter become zero. At this zero point, the Bragg wavelengths of the two gratings 10,21 are matched.

In this way, Bragg wavelength 61 of reference grating 21 is servo-controlled to be locked to Bragg wavelength 55 of sensor grating 10, this meaning that both Bragg wavelengths are essentially the same (or are offset by a given amount, depending upon initial conditions), and that both gratings are then being subjected to the same general physical condition, i.e. the servo-controlled-strain at reference grating 21 is equal to the measurand-induced-strain at sensor grating 10.

As will be appreciated, servo-controlled strain at reference grating 21 is produced by displacement of PZT 1, and is a function of output 86 of high voltage driver 85. It is possible to calibrate this strain as a function of applied voltage 86 in order to determine the magnitude of the measurand at sensor grating 10. However, since piezoelectric material is known to have a hysteresis behavior of about 10%, and is known to have poor linearity, this calibration method of providing a measurand output may not give accurate results.

To correct the above-described possibly inaccurate output, and as a feature of this invention, the resonant frequency of a fiber string that includes reference fiber 21, its two supporting fiber pieces 48, and its two clamping beads 111,113, is measured. As is well known, string 48,21,48 visually appears as one uniform fiber optic piece, since forming reference grating 21 at a mid portion thereof does not change the outer shape or the visual appearance of the fiber string.

As is well known, the resonant frequency of clamped string 48,21,48 of FIG. 1 varies as the square-root of the tension that is applied to the string by flexure 47. Since string tension is related to string strain through Young's modulus of elasticity and the cross-sectional area of the string, the strain that is applied to the string can be calculated from the mechanical resonant frequency of the string.

More specifically, a second servo controller 32 operates to vibrate string 48,21,48 at its own resonant frequency. As mentioned above, the upper and lower ends of this string are respectively attached to flexure arms 120,121. The top end of the string is now forced to vibrate by operation of PZT 2, or 30. This vibratory motion of the reference grating string depends on both the amplitude and the frequency of the transverse vibration that is caused by servo-energization of PZT 2. As is well known, with this physical arrangement between string 48,21,48 and PZT 2, the center-part 21 of the string moves in phase with the phase of the PZT 2 vibrations when PZT 2 vibrates at the resonant frequency of the string.

This transverse movement of the reference grating string 48,21,48 is movement of the string in the plane of FIG. 1, and this movement is detected by a displacement sensor 31 that is made up of an LED 90 that directs its output light in the direction of a photo-detector 91, and in a direction that is normal to the plane of FIG. 1. LED 90 is aligned so as to directly illuminate photo-detector 91. Reference grating 21, when at rest, is located so as to block about half of the light that LED 90 directs toward photo-detector 91. Since the output 92 of photo-detector 91 is a function of the total light that is received by photo-detector 91, output signal 92 changes in a sinusoidal manner when reference grating 21 moves in a transverse direction; i.e., moves horizontally in the plane of FIG. 1.

Output signal 92 is processed by high-pass filter 93, whose output 94 is provided as an input to automatic gain controller 95. As a result of the operation of high-pass filter 93, only the AC portion of signal 92 is detected. Automatic gain controller 95 now operates to adjust the amplitude of AC signal 92 so as to provide a constant-amplitude output 96 that energizes PZT 2. In other words, output 96 is of a constant amplitude, regardless of the frequency and the amplitude of input 94. The phase of output signal 96 is the same as the phase of input signal 94.

Output signal 96 is used to energize PZT 2. Only at the resonant frequency of string 48,21,48 will the displacement of the string's center-part 21 be in-phase with the displacement of PZT 2, and the string will sustain this resonant vibrational mode. In this way, second servo controller 32 causes string 48,21,48 vibrate at its own mechanical resonant frequency, as this resonant frequency is determined by the longitudinal strain that is applied to the string by PZT 1.

When the strain that is applied to string 48,21,48 by PZT 1 has operated to change the Bragg wavelength 61 of reference grating 21 to match the Bragg wavelength 55 of sensor grating 10, then the vibration frequency at this state of reference grating strain becomes a measure of the measurand at the sensor grating.

Frequency counter 98 now operates to count the per-unit-time oscillations of output 97 of automatic gain controller 95, this in turn being the frequency of oscillations of PZT 2. The resonant frequency output 99 of counter 98 is then converted to a corresponding measurand magnitude, and this measurand magnitude is visually displayed at display 100. In a preferred embodiment, display 100 provided a digital reading.

FIG. 1 shows a mechanical amplifier/flexure 47 that operates to apply a servo-controlled longitudinal or vertical strain to reference grating 21. Fiber string 48,21,48 can withstand up to 1% lengthwise strain. However, the maximum displacement of piezoelectric actuator PZT 1 is generally less than about 0.1% of its length. Mechanical amplifier 47 is used to increase the maximum strain that is applied to reference grating 21 by PZT 1.

In amplifier 47, PZT 1 pushes the two horizontally-extending and generally parallel arms 120,121 vertically apart. Pivot areas, or thin sections, 115,116 are provided at a similar location in each respective arm 120,121 in order to facilitate this relative movement of arms 120,121. Depending upon (1) the positions of pivots 115,116, (2) the relative location of PZT 1 with respect to pivots 115,116, and (3) the relative displacement of the right hand ends of arms 120, 121, the horizontal displacement of PZT 1 is amplified by a ratio of the distance L2 to the distance L3, shown in FIG. 1.

FIG. 2 shows a rectangle shaped flexure 150 that improves the piezoelectric displacement amplification of FIG. 1's PZT 1, 27. The bottom portion of flexure 150 somewhat resembles flexure 47 of FIG. 1. However, flexure 150 comprises six solid metal arms 130,131,132,133,134, 135 that are connected by six thin pivot sections or areas 136,137,138,139,140,141.

As shown, arms 130,132,133,134 lie on two vertically spaced and horizontal lines that form two parallel sides of a rectangle, while arms 131,135 form the other two parallel sides of the rectangle. In addition, in flexure 150 piezoelectric actuator PZT 1 comprises two piezoelectric sections 227 and 327.

Figure 2A:
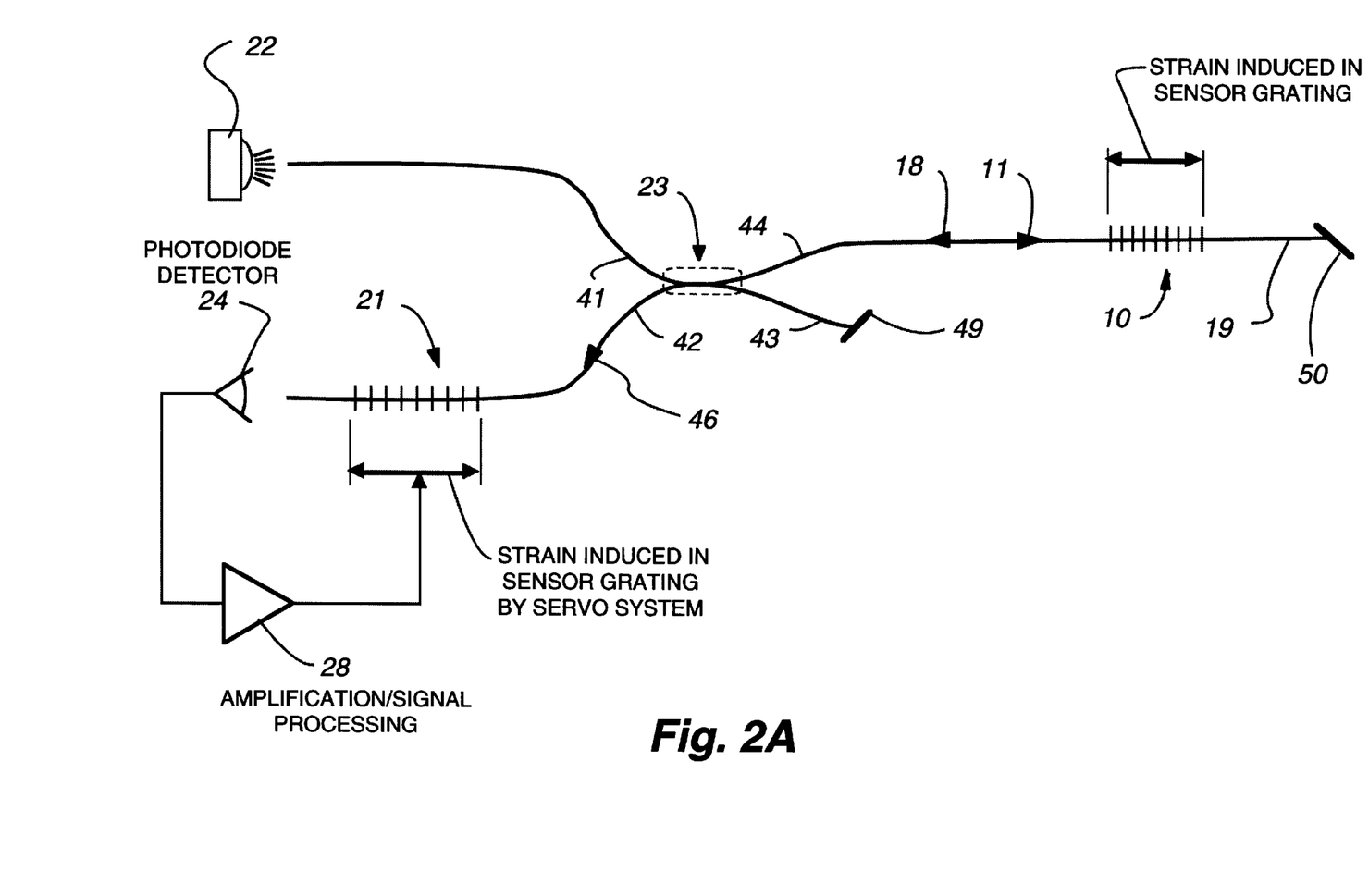
Figure 2B:
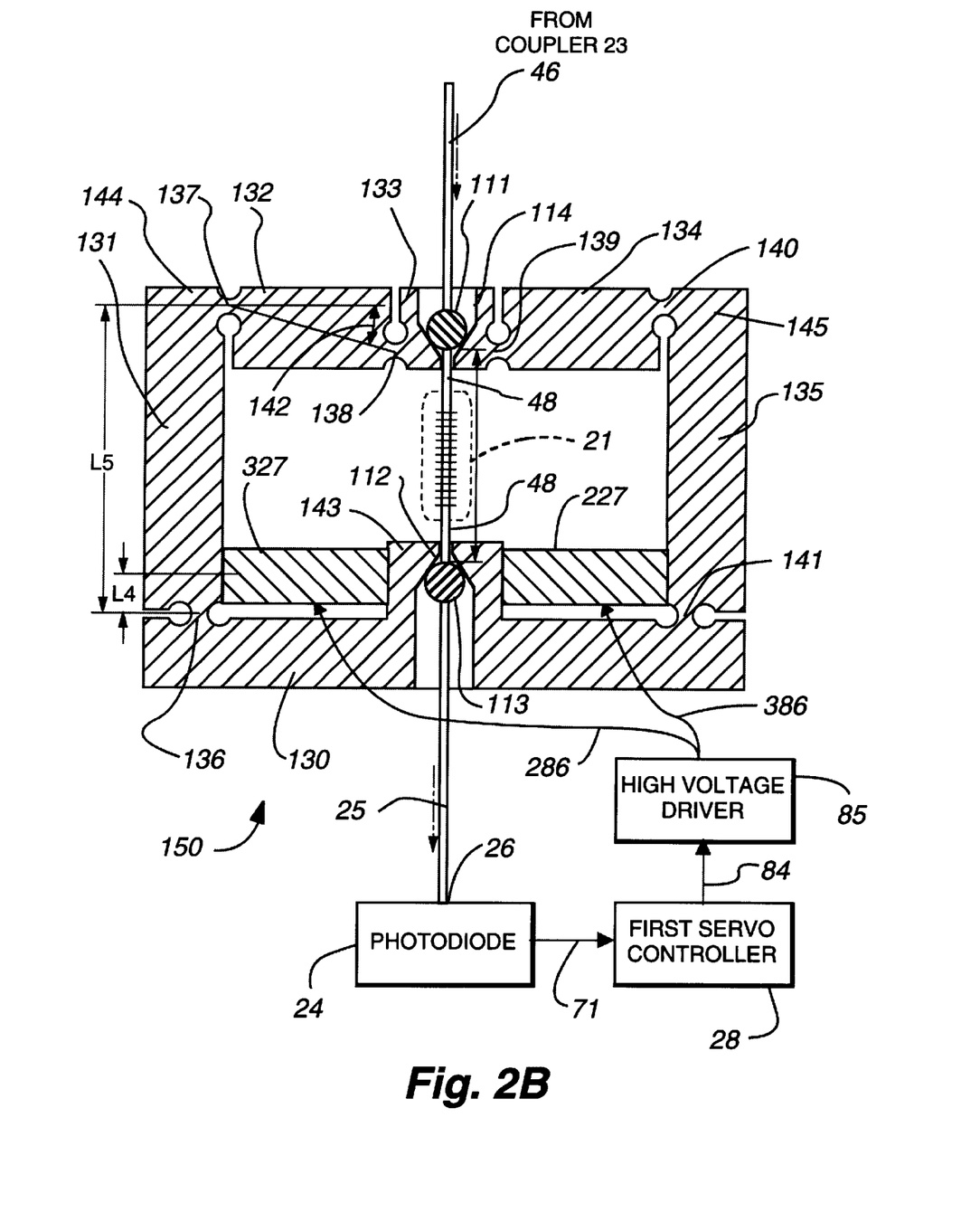
FIG. 2B is a second embodiment of a flexure that is usable in a FIG. 1 type system.

PZT 2 of FIG. 1 is not shown in FIG. 2A; however, this actuator is located at either the upper leg 133 or the lower leg 130 of flexure 150, closely adjacent to the upper or the lower end of the fiber optic string 48,21,48 that is shown in FIG. 2B.

The two piezoelectric actuators 227,327 operate to apply horizontal forces to arms 135,131, respectively. At the top ends 144,145 of arms 131,135 the piezoelectric displacement is amplified by the FIG. 2 distances L5, L4, i.e. by the ratio L5/L4. The resulting horizontal displacement of arm ends 144, 145 operates to change the angle that is defined by number 142 in FIG. 2, wherein a first angle 142 is defined by a first straight line that extends through pivots 137 and 138, and a second angle 142 is defined by second straight line that extends through pivots 139 and 140.

More specifically, the ratio of (1) the vertical displacement of center arm 133 and (2) the horizontal displacement of the top ends 144,145 of the two side arms 131,135, is inversely proportional to the tangent of angle 142. In this way, with a piezoelectric actuator 227,327 that has a finite maximum displacement, flexure 150 of FIG. 2 operates to produce a relatively large displacement/strain that is limited only by the compression of the piezoelectric actuators themselves. Thus, flexure 150 operates to provide a large displacement amplification factor that is easily adjusted simply by changing the initial amount of angle 142.

As was true of FIG. 1, the resonant frequency of FIG. 2's clamped fiber string 48,21,48 that includes reference grating 21 is a function of the longitudinal, or vertical strain that is applied to the string, and this strain is measured by second servo controller 32 and frequency counter 98.

The Bragg wavelength 61 of reference grating 21 is also a function of this servo-longitudinal strain, as applied by first servo controller 28. Therefore, the resonant frequency of string 48,21,48 is a direct function of the Bragg wavelength 61 of reference grating 21.

The Bragg wavelength of sensor grating 10 is a function of the measurand that is currently present at the sensor grating. Since the Bragg wavelength of reference grating 21 is servo-controlled to be matched to the Bragg wavelength of sensor grating 10, measurement of the resonant frequency of string 48,21,48 provides a direct measurement of the measurand.

In summary, this invention provides a sensor grating 10 and a reference grating 21. A light beam 18 is reflected out of sensor grating 10, and this reflected light beam 18 contains wavelength information relative to the magnitude of the measurand currently at sensor grating 10. This reflected beam is now directed to reference grating 21 where it is filtered such that the total light intensity that passes through reference grating 21 is a function of the Bragg wavelength mismatch/match between the two gratings 10,21. A first servo controller 28 operates to apply a variable magnitude strain to reference grating 21 until the total light intensity that passes through reference grating 21 is servo-locked onto a minimum transmitted light intensity. In this case, the reference grating's Bragg wavelength matches the sensor grating's Bragg wavelength. A second servo controller 32 now vibrates reference grating 21 in a variable manner so as to lock onto its resonant frequency. This resonant frequency is then converted into a measurement of the measurand at sensor grating 10.

Devices for use as terminators, such as for elements 49 and/or 50, are well known to the skilled artisan. Examples include index-matching oil, commercially available fiber terminators, protected angled cleaves, or the like. In addition, coupler 23 could be replaced by a circulator although circulators are currently more expensive than the coupler shown.

The present invention has been described in detail while making reference to preferred embodiments of the invention. It is apparent that upon learning of this invention, others skilled in the art will readily visualize yet other embodiments of the invention that are within its spirit and scope. Thus, the above detailed description should not be taken as a limitation on the spirit and scope of this invention.

What is claimed is:

1. Sensor apparatus for determining the magnitude of a physical condition, comprising:

a sensor-fiber-grating subjected to said physical condition; said sensor-fiber-grating having a core;

a broad-band light source operable to directed a light beam into one end of said core of said sensor-fiber-grating to thereby produce a first constructive-interference light beam that is reflected out of said one end of said core of said sensor-fiber-grating;

a reference-fiber-grating having a core;

means direction at least a portion of said first constructive-interference light beam into one end of said core of said reference-fiber-grating;

controllable force means subject said reference-fiber-grating to a variable strain force to thereby produce a second constructive-interference light beam within said core of said reference-fiber-grating;

light intensity sensitive means associated with said reference-fiber-grating;

said light sensitive means having an output responsive to said second constructive-interference light beam, and servo means having an input controlled by said output of said light sensitive means;

said servo means having an output connected to control said controllable strain force means in a manner to produce a strain of said reference-fiber-grating at which said second constructive-interference light beam is maximized.

2. The sensor apparatus of claim 1 including:

output means controlled by said servo means for indication said magnitude of said physical condition.

3. The sensor apparatus of claim 2 wherein:

said servo means is controlled in a manner to vary said strain of said reference-fiber-grating in order to determine a strain of said reference-fiber-grating at which a minimum intensity light beam is transmitted by said reference-fiber-grating;

whereupon said output means operates to indicate a magnitude of said physical condition to which the sensor-fiber-grating is subjected.

4. The sensor apparatus of claim 3 wherein:

said physical condition is selected from the group strain, temperature or pressure.

5. The sensor apparatus of claim 1 wherein:

said light sensitive means comprises a light detector that is associated with an end of said reference-fiber-grating that is opposite to said one end; and said servo means i s controlled in a manner to vary said strain of said reference-fiber-grating in order to determine a strain of said reference-fiber-grating at which a minimum intensity light beam is transmitted out of an opposite end of said reference-fiber-grating.

6. The sensor apparatus of claim 5 wherein:

said physical condition is selected from the group strain, temperature or pressure.

7. A method for determining the magnitude of a physical condition to which a first fiber grating having a generally fixed length is subjected, comprising the steps of:

directing a light beam into said first fiber grating in order to produce a first output light beam whose amplitude/wavelength spectrum is a function of the magnitude of said physical condition;

providing a second fiber grating having a controllable strain;

directing said first output light beam into said second fiber grating in order to produce a second output light beam whose amplitude/wavelength spectrum is a function of said controllable strain of said second fiber grating and said first output light beam;

changing said strain of said second fiber grating until said intensity of said second output light beam is minimized; and providing an output as a function of said changed strain of said second fiber grating at which said amplitude of said second output light beam is minimized.

8. The method of claim 7 including the steps of:

providing force servo means to vary said strain of said second fiber grating in a variable manner in order to determine a strain of said second fiber grating at which a maximum intensity light beam is reflected by said second fiber grating.

9. The method of claim 8 including the step of:

providing light detector means to detect light transmitted by said second fiber grating.

10. The method of claim 9 wherein:

said physical condition is selected from the group strain, temperature or pressure.

11. The method of claim 7 wherein said physical condition is selected from the group strain, temperature or pressure.

12. Apparatus for measuring the magnitude of a physical condition, comprising:

an active-fiber-grating subjected to said physical condition; said active-fiber-grating having an elongated core;

a broad-wavelength light source operable to directed a first input light beam into one end of said core of said active-fiber-grating, to thereby produce a first narrow-wavelength output light beam that is transmitted out of said core of said active-fiber-grating;

said first output light beam having a first wavelength spectrum that varies as a function of said magnitude of said physical condition;

a reference-fiber-grating having a core;

means direction at least a portion of said first output light beam into one end of said core of said reference-fiber-grating;

controllable force means subject said reference-fiber-grating to a variable strain force, to thereby generate a second output light beam from said core of said reference-fiber-grating;

said second output light beam having a second wavelength spectrum that varies as a function of said strain of said reference-fiber-grating and said first wavelength spectrum of said first output light beam;

light detecting means operable to receive said second output light beam;

said light detecting means having an output whose magnitude is responsive to said second output light beam; and closed-loop servo means having an input controlled by said output of said light detecting means, and having an output operable to control said force means;

said controllable force means being controlled by said output of said closed-loop servo means in a manner to produce a strain of said reference-fiber-grating at which said output of said light detecting means is a minimized.

13. The apparatus of claim 12 including:

output means controlled by said closed-loop servo means operable to digitally indicate said magnitude of said physical condition.

14. The sensor of claim 13 wherein:

said closed-loop servo means operates to vary said strain of said reference-fiber-grating in order to determine a strain of said reference-fiber-grating at which maximum intensity constructive-interference is produced within said core of said reference-fiber-grating;

whereupon said output means operates to indicate the magnitude of said physical condition to which the active-fiber-grating is subjected.

15. The sensor of claim 14 wherein:

said physical condition is selected from the group strain, temperature or pressure.

16. A method of measuring the magnitude of a physical condition such as strain, temperature and/or pressure, comprising the steps of:

providing an elongated active optical fiber grating at a first location whereat said active optical fiber is subjected to said physical condition;

providing an elongated reference optical fiber grating at a second location that is remote from said first location;

directing a broad band input light beam into an entry end of said active optical fiber grating so as to cause said input light beam to be divided into a first constructive interference reflected light beam and a first transmitted light beam;

directing said first constructive interference reflected light beam into an entry end of said reference optical fiber grating so as to cause said first constructive interference reflected light beam to be divided into a second constructive interference reflected light beam and a second transmitted light beam;

subjecting said reference optical fiber grating a variable strain force;

detecting a critical strain of said reference optical fiber grating at which said second constructive interference reflected light beam is maximized and said second transmitted light beam is minimized;

sensing said critical strain of said reference optical fiber grating; and providing an output as a function of said critical strain of said reference optical fiber grating.

17. The method of claim 16 wherein said detecting step includes the step of:

detecting a wavelength characteristic of said second transmitted light beam when said reference optical fiber grating is subjected to said critical strain.

18. The method of claim 17 wherein said sensing step includes the step of:

determining a mechanical resonant frequency of said reference optical fiber grating when subjected to said critical strain.

19. The method of claim 16 wherein said sensing step includes the step of:

determining a mechanical resonant frequency of said reference optical fiber grating when subjected to said critical strain.

20. Apparatus for measuring the magnitude of a physical condition such as strain, temperature and/or pressure, comprising:

a first elongated fiber grating subjected to said physical condition;

a second elongated fiber grating at a location remote from said first fiber grating;

a broad wavelength input light beam directed into an entry end of said first fiber grating so as to generate a constructive interference light beam having an intensity peak at a frequency Bs that is a function of said magnitude of said physical condition;

light path means directing said constructive interference light beam into an entry end of said second fiber grating so as to generate a transmitted light beam that is transmitted out of an exit end of said second fiber grating;

force generating means subjecting said second fiber grating to a variable strain force;

detecting means responsive to said transmitted light beam, and connected to control said force generating means in a manner to produce a critical strain of said second fiber grating at which said transmitted light beam is of a minimum intensity at frequency Br that is related to said frequency Bs;

sensing means for sensing said critical strain of said second fiber grating; and output means providing an output as a function of said critical strain of said second fiber grating.

21. The apparatus of claim 20 including:

means for determining a mechanical resonant frequency of said second fiber grating when subjected to said critical strain;

said output being determined as a function of said mechanical resonant frequency.

22. A method for measuring a physical condition; comprising the steps of:

providing an active optical fiber grating at a physical location whereat said active optical fiber is subjected to said physical condition;

providing a reference optical fiber grating that is not subjected to said physical condition;

directing a broad band light beam into an entry end of said active fiber-grating so as to cause a constructive interference light beam to be reflected out of said entry end of said active fiber grating;

directing said constructive interference light beam into an entry end of said reference fiber grating;

subjecting said reference fiber grating a variable elongation force;

detecting a critical length of said reference fiber grating at which (1) a maximum intensity constructive interference light beam is reflected out of said entry end of said reference fiber grating; and (2) a minimum intensity light beam is transmitted out of an exit end of said reference fiber grating;

sensing said critical length of said reference fiber grating; and providing an output as a function of said critical length of said reference fiber grating.

23. The method of claim 22 wherein said detecting step includes the steps of:

detecting an intensity characteristic of said light beam that is transmitted out of an exit end of said reference fiber grating for said critical length of said reference fiber grating.

24. The method of claim 23 wherein said sensing step includes the step of:

determining a mechanical resonant frequency of said critical length of said reference fiber grating.

25. The method of claim 24 wherein said physical condition is selected from the group strain; temperature and pressure.

26. The method of claim 22 wherein said sensing step includes the step of:

determining a mechanical resonant frequency of said critical length of said reference fiber grating.

27. The method of claim 26 wherein said physical condition is selected from the group strain; temperature and pressure.

28. Apparatus for measuring the magnitude of a physical condition at a first physical location, comprising:

a sensor optical fiber grating at said first physical location;

a reference optical fiber grating at a second physical location that is remote from said first physical location;

an input, broad wavelength band, light beam directed into an entry end of said sensor optical fiber-grating so as to cause, (1) a first constructive interference light beam to be reflected out of said entry end of said sensor optical fiber grating, and (2) a first transmission light beam to be transmitted out of an exit end of said sensor optical fiber grating;

said light beams (1) and (2) having a complimentary maximum/minimum wavelength characteristic at a frequency Fs that is a function of said magnitude of said physical condition;

light path means directing one of said light beams (1) or (2) into an entry end of said reference optical fiber grating;

force generating means subjecting said reference optical fiber grating to a controllable elongation force;

light detecting means for detecting a critical length of said reference optical fiber grating at which (3) a maximum intensity second constructive interference light beam is reflected out of said entry end of said reference optical fiber grating, and (4) a minimum intensity transmission light beam is transmitted out of an exit end of said reference optical fiber grating;

said light beams (3) and (4) having a complimentary maximum/minimum wavelength characteristic at a frequency Fr that is a function of said magnitude of said physical condition; and output means connected to be controlled by said light detecting means for generating an output indicative of said magnitude of said physical condition.

29. The apparatus of claim 28 including:

means for detecting a mechanical resonant frequency of said critical length of said reference optical fiber grating, wherein said output means generates said output as a function of said detected mechanical resonant frequency.

30. The apparatus of claim 29 wherein said physical condition is selected from the group strain, temperature and pressure.

31. Apparatus for sensing the magnitude of a physical condition, comprising:

a sensor fiber grating subjected to said physical condition for generating a first light beam that is indicative of said magnitude of said physical condition and as a function of a Bragg wavelength of said sensor fiber grating;

a reference fiber grating that is not subjected to said physical condition;

light path means for directing said first light beam to said reference fiber grating;

said reference fiber grating operating to generate a second light beam that is a function of a Bragg wavelength of said reference fiber grating;

force means responsive to said second light beam and operable to apply a force to said reference fiber grating so as to effect a Bragg wavelength match between said Bragg wavelength of said sensor fiber grating and said Bragg wavelength of said reference fiber grating; and means for indicating said magnitude of said physical condition as a function of said Bragg wavelength match.

32. The apparatus of claim 31 including:

means for determining a mechanical resonant frequency of said reference fiber grating when said force means operates to effect said Bragg wavelength match; and output means responsive to said determined mechanical resonant frequency for indication said magnitude of said physical condition.

33. The apparatus of claim 32 wherein said physical condition is selected from the group strain, temperature and/or pressure.

34. A method for determining the magnitude of a measurand that produces a first strain on a sensor grating, comprising the steps of:

directing a broad bandwidth input light beam into said sensor grating in order to produce a first output light beam having a first Bragg wavelength that is a function of said magnitude of said measurand;

providing a reference grating;

directing said first output light beam into said reference grating in order to produce a second output light beam having a second Bragg wavelength that is a function of a second strain that is applied to said reference grating;

applying said second strain to said reference grating in a variable manner in order to determine a magnitude of said second strain at which said second Bragg wavelength is matched to said first Bragg wavelength; and providing an output indicative of said magnitude of said measurand as a function of said determined magnitude of said second strain that results in said second Bragg wavelength being matched to said first Bragg wavelength.

35. The method of claim 34 including the steps of:

providing light detector means to detect a minimum intensity light beam transmitted through said reference grating;

providing an output from said light detector means in accordance with said minimum intensity transmitted light beam;

providing first servo means having a dither output that operates to dither said second strain applied to said reference grating;

providing said output of said light detector means as an input to said first servo means in order to determine a second strain whereat said minimum intensity transmitted light beam is produced;

locking said first servo means onto said determined second strain; and providing said output indicative of said magnitude of said measurand as a function of said locking of said first servo means.

36. The method of claim 35 including the steps of:

providing second servo means operable to seek a resonant frequency of said reference grating after said first servo has been locked;

providing an output from said second servo means that is operable to vibrate said reference grating;

providing an input to said second servo that is responsive to said resonant frequency vibration state of said reference grating; and locking said second servo onto said resonant vibration state.

37. The method of claim 36 including the step of:

providing said output indicative of said magnitude of said measurand as a function of said locking of said second servo means.

38. The method of claim 37 wherein:

said measurand is selected from the group strain, temperature or pressure.

39. The method of claim 34 including the step of:

providing force servo means to vary said second strain in a variable manner to determine a second strain that causes a minimum intensity of light beam to be transmitted through said reference grating.

40. The method of claim 39 including the step of:

providing light detector means to detect said minimum intensity light beam transmitted through said reference grating;

utilizing said light detector means to produce a locked state of said force servo means, to thereby lock said determined second strain to produce said minimum intensity light beam transmitted through said reference grating; and providing said output indicative of said magnitude of said measurand as a function of said locked determined second strain.

41. The method of claim 34 wherein said physical measurand is selected from the group strain, temperature and pressure.

42. Measurand magnitude measuring apparatus, comprising:

a first fiber grating subjected to a first force whose magnitude changes as the magnitude of a measurand changes;

first path means injecting a beam of electromagnetic radiation into said first fiber grating in order to produce a first output beam having a first wavelength characteristic that is indicative of said magnitude of said first force;

a second fiber grating;

second path means injecting said first output light beam into said second fiber grating;

controllable force means having an output connected to apply a variable magnitude, servo controlled, second force to said second fiber grating;

said variable magnitude second force operating to produce a second output light beam having a variable second wavelength characteristic that is indicative of said variable magnitude second force and of said first wavelength characteristic;

said variable magnitude second force being servo controlled to be related to said first force in such a manner that said servo controlled magnitude of said second force is indicative of said magnitude of the measurand;

means for determining a mechanical resonant frequency of said second fiber grating when said second fiber grating is subjected to said servo controlled magnitude of said second force; and means responsive to said determined mechanical resonant frequency for providing an output that is indicative of said magnitude of the measurand.

43. The measurand measuring apparatus of claim 42 wherein said means for determining said mechanical resonant frequency of said second fiber grating comprises:

a mechanical fixture placing said second fiber grating under a longitudinal strain;

an actuator for vibrating one end of said second fiber grating;

a light-emitter/photodetector pair associated with a mid-portion of said second fiber grating for detecting when said second fiber grating has been placed in a mechanical resonant state by operation of said actuator; and a positive feedback, gain-limited, servo system having an input connected to said photodetector, and having an output connected to said actuator, said servo system operating to servo lock said second fiber grating to said mechanical resonant state.

44. The measurand measuring apparatus of claim 43 including:

a frequency counter connected to be driven by said servo system; and a visual output display connected to be driven by said frequency counter.

45. The measurand measuring apparatus of claim 42 wherein said output display is a digital readout device.

* * * * *